United States Patent [19]

Hill

[11] 3,923,802
[45] Dec. 2, 1975

[54] PROCESS FOR PREPARING METAL SALTS OF DICHLOROISOCYANURIC ACID

[75] Inventor: Howard W. Hill, Concord, Calif.

[73] Assignee: The Dow Chemical Company, Midland, Mich.

[22] Filed: July 5, 1974

[21] Appl. No.: 485,873

[52] U.S. Cl. .................................. 260/248 C
[51] Int. Cl.² ................................. C07D 251/28
[58] Field of Search ........................ 260/248 C

[56] References Cited
UNITED STATES PATENTS 3,272,813  9/1966  Symes .......................... 260/248
3,758,463  9/1973  Berkowitz et al. .............. 260/248

Primary Examiner—John M. Ford
Attorney, Agent, or Firm—Gary D. Street; J. Roger Lochhead

[57] ABSTRACT

The invention is a process for preparing an aqueous solution of an alkali metal salt of dichloroisocyanuric acid by reacting an aqueous solution of the corresponding trialkali metal salt of cyanuric acid with a water immiscible solvent containing in excess of two mols of trichloroisocyanuric acid for each mol of cyanuric acid salt utilized.

3 Claims, No Drawings

PROCESS FOR PREPARING METAL SALTS OF DICHLOROISOCYANURIC ACID

BACKGROUND OF THE INVENTION

Alkali metal salts of dichloroisocyanuric acid are used to sanitize swimming pools and as safe and convenient substitutes for sodium hypochlorite bleach. Said salts have higher available chlorine concentrations than bleach and less residual alkalinity. Further, in the case of swimming pool utilization, the desired sanitizing is realized without a significant change in the pH of the pool.

While there are many well known methods of producing the various salts of chlorinated isocyanuric acid, they generally have the drawback of requiring exact stoichiometry, resulting in process control problems, or utilize solid reactants, which results in product handling and separation problems.

For instance, U.S. Pat. No. 3,305,057 teaches the reaction of solid trichloroisocyanuric acid with aqueous trisodium cyanurate in proportions to give a reaction pH of 5–8.5. Sufficient water is utilized to dissolve the trisodium cyanurate, but not enough to dissolve the resulting sodium dichloro salt, whereby the product is periodically or continuously removed as the solid dihydrate or monohydrate.

French Pat. No. 2,069,469, on the other hand, teaches the reaction of dry cyanuric acid, dry trichloroisocyanuric acid and a sodium hydroxide solution. These reactants are added continuously to a mixing vessel while maintaining a redox potential of 900–950 millivolts. The product is continuously filtered out and the filtrate is recycled.

U.S. Pat. No. 3,035,056 teaches chlorination of aqueous trisodium or tripotassium cyanurate to a final pH of 6.0 to 8.5 at which time the stoichiometric ratio of chlorine to trialkyl cyanurate is two to one, producing NaCl or KCl and the alkali metal dichloroisocyanurate. A portion of the latter product can be separated by chilling the solution and precipitating the dihydrate salt. However, the patent does not teach a way of completely separating the by-product alkali metal chloride from the balance of the alkali metal dichloroisocyanurate.

U.S. Pat. No. 2,964,525 teaches that dichloroisocyanuric acid can be made by chlorinating dipotassium cyanurates. U.S. Pat. No. 2,969,360 teaches the chlorination of cyanuric acid in two equivalents of aqueous NaOH. The resulting dichloroisocyanuric acid, in slurry form, can be filtered and the solids washed and dried to make the pure acid. If the sodium salt is desired, addition of a stoichiometric amount of NaOH followed by drying will result in said salt.

SUMMARY OF THE INVENTION

The instant invention offers two advantages over the prior art, namely the elimination of the necessity for exact stoichiometric amounts of reactants so long as a ratio equal to or greater than two mols of trichloroisocyanuric acid per mol of trialkali metal cyanurate is utilized; and secondly, the utilization of reactants which are in liquid phase throughout. These two advantages result in simplification of process design and control and easier separation of the desired alkali metal salt of dichloroisocyanuric acid.

In summary, then, the process of this invention comprises reacting an aqueous solution of a trialkali metal salt of cyanuric acid with a solution of trichloroisocyanuric acid in a water-immiscible solvent which is relatively resistant to chlorination. It is required that at least two mols of trichloroisocyanuric acid are reacted with each mol of trialkali metal salt of cyanuric acid utilized.

DETAILED DESCRIPTION OF THE INVENTION

All of the starting materials for the process of this invention are commercially available, the trialkali metal salt of cyanuric acid normally being prepared by reacting said acid with, for instance, sodium or potassium hydroxide.

Solvents for the acid reactant which are suitable herein include methylene chloride, benzene, 1,2-dichloroethane, chlorobenzene and 1,1,2-trichloroethane. Other solvents which are water-immiscible and chlorination resistant, which may be readily determined, are also suitable.

The temperature in the reactor should be maintained between the freezing point and the azeotrope temperature for water and the solvent utilized (approximately 38°C. in the case of water-methylene chloride). Temperature does affect the solubility of the alkali metal dichloroisocyanurate product in the aqueous phase, and therefore should be maintained so that a high concentration of the product is kept in said phase in order to minimize the water removal required. The preferred temperature is generally from about 10°–35°C.

It is generally desirable to carry this reaction out at ambient pressure in order to minimize the necessity for high pressure equipment. However, there is no reason why superatmospheric pressures could not be used if deemed desirable.

The concentration of trialkali metal cyanurate in the aqueous feed will depend on the solubility of the corresponding alkali metal dichloroisocyanurate. At least enough water must be present in the final mixture to keep the dichloro product in solution. For instance, the solubility of sodium dichloroisocyanurate is about 21 wt. % at room temperature. Since one mol of the trisodium salt forms three mols of the dichloro product when reacted with two mols of the trichloro acid, water required per pound of trimetal salt is about 12.7 lbs. Therefore, approximately a 7.3% solution of trisodium salt is the maximum in order to insure that no solid phase will form.

The reaction will occur only as fast as the trichloro acid transfers from the organic phase to the aqueous phase. If no excess trichloro acid is present, the rate will become impractically slow unless a countercurrent flow stream is utilized. If an excess of trichloro acid is used, the rate is maintained until the trialkali metal salt is all reacted. Thus, a one-stage continuous fully mixed reactor may be utilized.

Regarding reaction residence time, the reaction depends on interfacial transfer from the organic phase to the aqueous phase. When said transfer has been made, the reaction can be considered complete because the reaction rate in the aqueous phase is so fast that it can essentially be neglected. Thus, the residence time depends on the interfacial area generated by the mixer and the driving force, or concentration of the trichloro acid, in the organic phase. Time required for any size batch reactor can be easily calculated by known engineering techniques.

The process can either be batch or continuous. The dichloro salt in the aqueous phase may be recovered by known techniques such as crystallization followed by filtration or centrifugation. The final product is normally spray dried to give prilled solids suitable for use as a swimming pool sanitizer, or the like.

SPECIFIC EXAMPLES

In a 125 ml. Erlenmyer flask 2.268 grams of trichloroisocyanuric acid was dissolved in 85 ml. of methylene chloride by stirring with a magnetic stirrer. To this, 5 ml. of a solution containing 0.607 mols of trisodium cyanurate per liter and 0.133 mols of free NaOH per liter was added with stirring. As rapidly as possible five ml. of water was added to provide enough water to keep the anticipated product in solution. Crystals had appeared, but after addition of the water clear liquid phases were observed. Ten minutes after addition of the trisodium cyanurate solution, the stirring was stopped and the two phases which settled rapidly were decanted. The organic phase volume was 84 ml. The aqueous phase was rinsed from the separatory and diluted to 25 ml. for analysis. The aqueous phase was found to contain 19 milliequivalents of available chlorine which is 100.6% of the theoretical expected from the two reactions:

$$Na_3(CNO)_3 + 2Cl_3(CNO)_3 \rightarrow 3NaCl_2(CNO)_3$$
$$2NaOH + Cl_3(CNO)_3 \rightarrow NaCl_2(CNO)_3 + NaCl.$$

By titration, the 84 ml. organic phase was found to contain 8.6 milleatoms $Cl^+$, which represents 29.5% of the original trichloroisocyanuric acid introduced.

The above reaction was repeated with benzene and 1,2-dichloroethane as acid solvents, both of which were also satisfactory.

I claim:

1. A process for preparing an alkali metal salt of dichloroisocyanuric acid comprising reacting an aqueous solution of the corresponding trialkali metal salt of cyanuric acid with a solution of trichloroisocyanuric acid in a water immiscible solvent which is relatively resistant to chlorination, said reaction to be carried out so that the reactants are maintained in the liquid phase, and said trichloroisocyanuric acid to be used at a ratio in excess of 2 mols per mol of trialkali metal salt of cyanuric acid.

2. The process of claim 1 wherein the water-immiscible solvent is selected from the group comprising methylene chloride, benzene, 1,2-dichloroethane, chlorobenzene and 1,1,2-trichloroethane.

3. The process of claim 1 wherein the temperature is maintained from about 10° to 35°C.

* * * * *